United States Patent [19]

Dahlberg et al.

[11] 4,225,070
[45] Sep. 30, 1980

[54] METHOD OF SIMULTANEOUSLY OPENING TWO SCORES TRANSVERSE TO ONE ANOTHER

[75] Inventors: John R. Dahlberg, Jeannette; Robert P. DeTorre, Pittsburgh, both of Pa.

[73] Assignee: PPG Industries, Inc., Pittsburgh, Pa.

[21] Appl. No.: 37,244

[22] Filed: May 9, 1979

[51] Int. Cl.$^3$ ............................................. C03B 33/02
[52] U.S. Cl. ........................................ 225/2; 225/96.5
[58] Field of Search ................................. 225/2, 96.5

[56] References Cited

U.S. PATENT DOCUMENTS

| | | | |
|---|---|---|---|
| 4,072,259 | 2/1978 | Welton | 225/2 |
| 4,088,255 | 5/1978 | DeTorre | 225/96.5 X |
| 4,109,841 | 8/1978 | DeTorre | 225/96.5 |

*Primary Examiner*—Frank T. Yost
*Attorney, Agent, or Firm*—Donald Carl Lepiane

[57] ABSTRACT

Intersecting first and second scores in a glass sheet are simultaneously opened by imposing deeper first scores in the glass sheet than second scores. A bending moment force applied to a second score opens the second score and the resulting shock from opening the second score opens portions of the intersecting first scores.

10 Claims, 4 Drawing Figures

METHOD OF SIMULTANEOUSLY OPENING TWO SCORES TRANSVERSE TO ONE ANOTHER

FIELD OF THE INVENTION

This invention relates to a method of severing a refractory material, e.g., glass.

DISCUSSION OF THE PRIOR ART AND TECHNICAL PROBLEMS

In the prior art there are taught various techniques for opening a score line. As used herein the term "opening a score" or "open a score" is defined as propogating the depth of a score imposed in a refractory material, e.g., glass to sever the glass along the score. U.S. Pat. Nos. 4,072,259 and 4,088,255 teach the opening of scores in a glass sheet by advancing the sheet with the score transverse to the direction of sheet advance and applying a bending moment about the score. In U.S. Pat. No. 4,109,841 the score to be opened is generally parallel to the direction of sheet advance. Although each of the above techniques are acceptable for opening scores extending in the same direction, it would be advantageous to provide a technique for simultaneously opening scores that are transverse to and/or intersect one another. In this manner, the need to rotate the glass or provide two score opening stations would be eliminated.

SUMMARY OF THE INVENTION

This invention relates to a method of simultaneously opening transverse scores e.g. intersecting scores imposed in a sheet of refractory material e.g. a glass sheet. A first score and second score are imposed in the sheet with the scores transverse to and/or intersecting one another. The first score has a depth greater than the second score. A bending moment is applied to the second score to open same. As the resultant shock from opening the second score opens the at least a portion of the first score.

DESCRIPTION OF THE INVENTION

Figure 1:
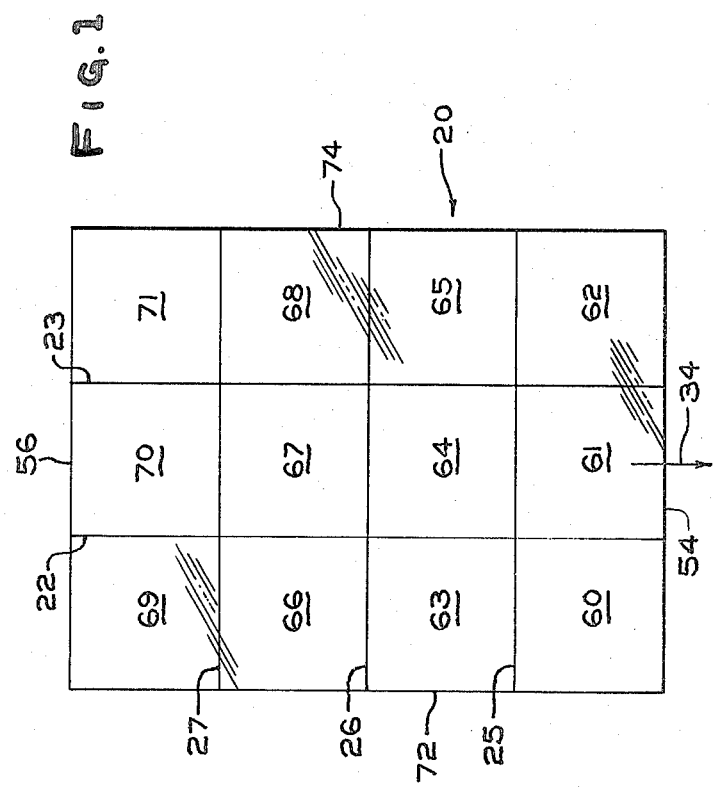
FIG. 1 is a plan view of a glass sheet having a first set of scores intersecting a second set of scores.

This invention relates to a method of simultaneously opening transverse and/or intersecting scores by applying a bending moment force about a score and using the resultant vibration or shock from opening the score to open a transverse score or scores. With reference to FIG. 1, there is shown a glass sheet 20 having a first set of spaced scores 22 and 23 intersecting a second set of spaced scores 25–27. In the practice of the invention, one set of spaced score e.g., scores 25–27 have a depth shallower than the other set of scores, e.g., scores 22. In this manner the resultant shock from opening the shallower scores, e.g., scores 25–27 is transmitted to the deeper scores, e.g., scores 22 and 23 to open the deep scores or portions thereof.

For purposes of discussing the invention, the magnitude of the resultant shock from opening the shallow score is a function of (1) the depth of the shallow score; (2) the speed at which the bending moment force is applied about the score and (3) the magnitude of the bending moment force applied about the shallow score. In general, as the depth of the shallow score decreases while the magnitude and speed at which the bending moment force is applied for opening the shallow score remains constant, the magnitude of the resultant shock increases and vice versa because the energy at the time of opening the score is increased. As the speed at which the bending moment force is applied increases while the magnitude of the bending moment force required to open the score line and the depth of the score remain constant, the magnitude of the resultant shock increases and vice versa because there is a rapid increase in energy when the shallow score is opened. As the magnitude of the bending moment force increases and the depth of the shallow score and speed at which the bending moment force is applied remain constant, the magnitude of the resultant shock increases and vice versa because more energy is applied about the shallow score to open same.

The minimum depth of the shallow scores 25–27 is selected such that the severing of the glass sheet is along the score about which a bending moment force of sufficient magnitude is applied to open the score. The minimum depth of the shallow score increases as the thickness of the glass sheet increases and is usually at least about 2% of the glass thickness. For example for a glass sheet having a thickness of about 0.070 inch (0.178 centimeter), the recommended minimum depth of the shallow score line is about 0.002 inch (0.005 centimeter); a piece of glass having a thickness of about 0.125 inch (0.318 centimeter), the recommended minimum depth of the shallow score is about 0.004 inch (0.0102 centimeter); and a glass piece having a thickness of about 7/32 inch (0.56 centimeter), the recommended minimum depth of the shallow score is about 0.005 inch (0.013 centimeter). The maximum depth of the shallow score is preferably about twice the minimum depth.

The depth of the deep score e.g., scores 22 and 23 is a function of the magnitude of the resultant shock from opening a shallow score. For example, as the magnitude of the resultant shock from opening a shallow score increases, the depth of the deep score may be decreased. For purposes of the invention the deep score is at least about 20% of the glass sheet thickness. There is no maximum score depth however, a film of glass should be present to maintain the of glass sheet together. Therefore it is recommended that the maximum depth of the deep score be about 90% and preferably about 80% of the glass sheet thickness.

The depths for the shallow and deep scores are recommended for an "open score." The term "open score" as used herein is a score having a fracture at the major surface of the glass contacted by a scoring facilities e.g. a wheel and extending into the body of the glass sheet toward the opposite major surface. When "closed scores" are used in the practice of the invention, it is recommended that depth of the shallow and deep scores be increased by about 10–15%. This is because for the same score depth a closed score requires more force to open than an open score. As used herein the term "closed score" is defined as a fracture within the body of the glass sheet spaced from opposed major surfaces and are of the type taught in U.S. Pat. Nos. 3,865,673; 3,865,293 and 4,057,184 which teachings are hereby incorporated by reference.

The magnitude of the resultant shock or force from opening a shallow score and the depth of the deep score is preferably selected such that opening the shallow score opens the portion of the deep scores between the shallow score 25, 26 or 27 and the leading edge of the glass sheet as well as a portion of the deep score between the shallow score opened and adjacent upstream shallow score. With this arrangement a glass sheet may be severed into glass pieces in a manner to be discussed below.

Typical examples of shallow score depths; deep score depths and stresses applied to the shallow score to open both the shallow score and deep score for a given glass thickness are shown in the following table.

| Recommended Score Depths and Stress For Simultaneously Opening Transverse Scores | | | |
|---|---|---|---|
| Glass Sheet Thickness in Inches (Centimeters) | Shallow Score Depth in Inches (Centimeters) | Deep Score Depth in Inches (Centimeters) | *Stress in pounds/ square inch (kilograms/square centimeter) Applied to Shallow Score to Open Shallow and Deep Scores |
| 0.078 (0.198) | 0.004 (0.010) | 0.068 (0.173) | 1700 (119) |
| 0.124 (0.315) | 0.006–0.008 (0.015–0.020) | 0.023 (0.058) | 2000 (140) |
| 7/32 (0.556) | 0.007–0.009 (0.018–0.023) | 0.160 (0.406) | 2700 (189) |

*The stress value ($p$) is determined from the following equation:
$$p = \frac{3wl}{2bt^2}$$
where:
w is the weight applied to the shallow score;
l is the spaced distance between sheet supports;
b is the length of the shallow score extending between edges of the glass sheet; and
t is the glass sheet thickness.

The sheet to be tested is mounted with the surface of the sheet having the score between a pair of spaced supports as a weight is applied to the opposite surface of the glass sheet. The weight is applied to the total length of the shallow score at a rate of about 1000 pounds per square inch per minute (70 kilograms per square centimeter per minute) to open the score.

Figure 2:
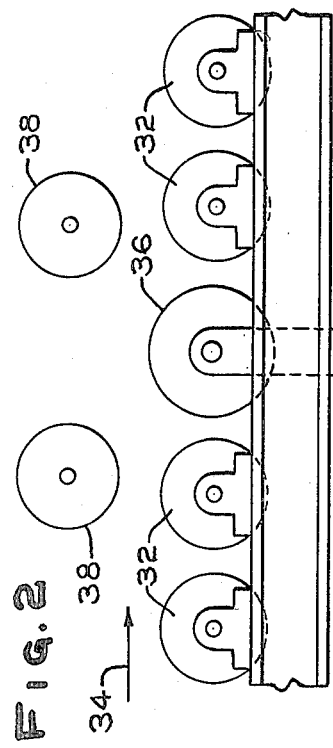
FIG. 2 is a side elevated view of a bending moment applying apparatus that may be used in accordance to the teachings of the invention to simultaneously opening ones of the first and second scores in the glass sheet shown in FIG. 1.

Shown in FIG. 2 is a bending moment applying apparatus 30 of the type taught in U.S. Pat. No. 4,072,259 which teachings are hereby incorporated by reference that may be used in the practice of the invention. In general, the apparatus 30 includes a plurality of conveyor rolls 32 rotated in any convenient manner to advance the glass sheet 20 along a sheet movement path designed by the arrow 34 with the shallow scores 25–27 transverse to the path 34. When a shallow score is adjacent or over lift roll 36, the roll 36 is conveniently raised upward as viewed in FIG. 2 to move the glass sheet against spaced holddown rolls 38. Continual upward movement of lift roll 36 opens the shallow score and the resultant shock from opening the shallow score opens portions of the deep scores 22 and 23 (1) between the opened shallow score and leading edge 54 of the glass sheet and (2) upstream of the opened shallow score. Thereafter the lift roll 36 drops until the next shallow score moves over the lift roll. The lift roll may be actuated to sever a moving glass sheet or a stationary sheet. The magnitude of the bending moment force of the apparatus 30 may be increased to increase the resultant shock from opening the shallow score by increasing the speed at which the lift roll 36 moves upward or increase the spaced distance between the holddown rolls 38 to increase the lever arm force acting on the glass sheet about the shallow score.

Figure 3:
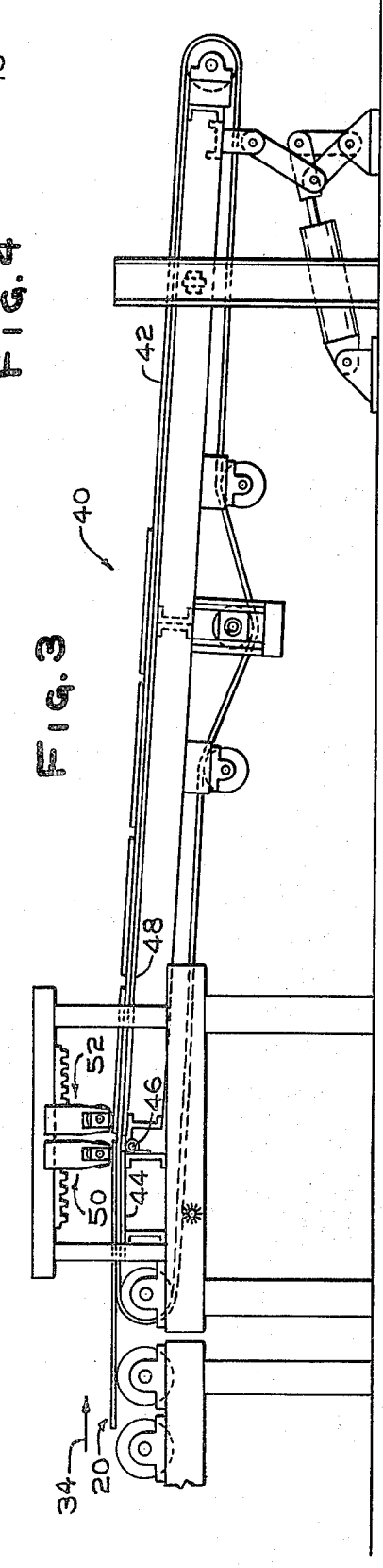
FIG. 3 is a side elevated view of another type of apparatus that may be used in the practice of the invention to simultaneously open ones of the first and second scores in the glass sheet shown in FIG. 1.

Shown in FIG. 3 is another type of score opening apparatus 40 taught in U.S. Pat. No. 4,088,255 which teachings are incorporated by reference that may be used in the practice of the invention. In general, and which reference to FIGS. 3 and 4 the apparatus 40 includes an endless belt 42 moving over a horizontal platform 44 hinged at 46 to an adjustable sloped platform 48. Mounted above the horizontal platform 44 and sloped platform 48 is vertically and horizontally adjustable holddown rolls 50 and 52 respectively. A more detailed discussion of the apparatus can be found in U.S. Pat. No. 4,088,255. The belt 42 advances the glass sheet 20 in the direction of the arrow 34 with the shallow scores 25–27 transverse to the direction of sheet advance. With specific reference to FIG. 4 the leading edge 54 of the sheet moves under the roll 50 and into engagement with roll 52. Continual movement of the belt 42 moves the leading edge 54 of the sheet 20 downward under the roll 52 as the holddown roll 50 prevents upward displacement of the sheet. Further movement of the sheet moves a shallow score over the hinged portion 46 to open the shallow score. The resultant shock opens at least portions of the deeper scores 22 and 23 extending from the leading edge 54 of the sheet to the opened shallow score and a portion of the deep scores 22 and 23 upstream of the opened score. Thereafter the opened shallow score becomes the leading edge of the glass sheet and the above is repeated. When the last shallow score is opened e.g. score 27, the deep scores 22 and 23 (1) between the leading edge 54 of the sheet and opened shallow score 27 and (2) between opened shallow score 27 and trailing edge 56 of the sheet open.

Figure 4:
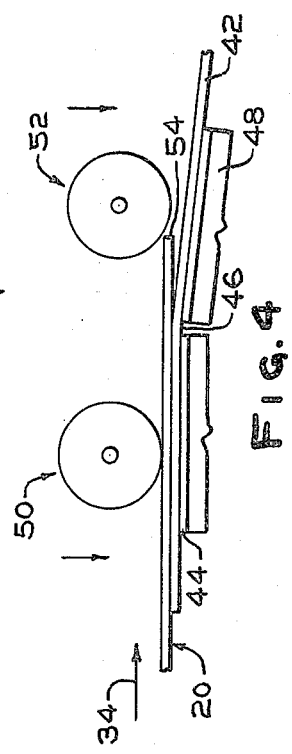
FIG. 4 is a side elevated view of the snapping section of the apparatus shown in FIG. 3 having portions removed for purposes of clarity.

The magnitude of the bending moment force applied about the score line by the apparatus shown in FIGS. 3 and 4 may be increased by increasing the belt speed, the slope of the sloping platform 48; the downward displacement of the roll 52 and the spaced distance between the roll 52 and hinged portion 46.

In the practice of the invention it is recommended that the scores to be opened intersect one another; however, the invention is not limited thereto. For example, deep scores originating at a shallow score can be opened by the resultant shock of opening the shallow score. Further, deep scores spaced from a shallow score can also be opened by opening the shallow score. However, as the distance between the deep scores and shallow score increase, the shock required to open the deep scores increase. Further, as the distance between the shallow score and deep score increases, the probability of deviating from the path of the deep score increases.

DETAILED DESCRIPTION OF THE INVENTION

The invention is practiced on apparatus 40 shown in FIGS. 3 and 4. A glass sheet 20 having a length of about 8 feet (2.4 meters), a width of about 4 feet (1.2 meters) and a thickness of about 0.078, inch (0.198 centimeter) is scored in any convenient manner with 3 shallow open scores 25–27 each about 1 foot (0.3 meter) apart between sides 72 and 74 of the sheet and 2 deep open scores 22 and 23 each 1 foot (0.3 meter) apart and intersecting to the shallow scores. The shallow scores have a depth of about 0.068 inch (0.173 centimeter).

The belt 42 of the apparatus 40 moves the glass at a speed of about 750 inches per minute (18.75 meters per minute). The roll 50 is spaced about 4½ inches (11.43 centimeters) from the hinge portion 46 and the roll 52 is on a center to center spacing of about 7½ inches (19.05 centimeters) with the roll 50. The slope of the platform 48 is about 5 relative to the horizontal platform 44. The leading edge 54 of the glass sheet 20 advances under the roll 50 over the hinge portion 46 into engagement with the roll 52 as shown in FIG. 4. Continued movement of the belt 42 moves the glass sheet 20 under the roll 52. As the shallow score 25 moves over and/or downstream of the hinged portion 46, the bending moment force opens the shallow score 25 and the resultant shock opens the portion of the deep scores 22 and 23 between the leading sheet edge 54 and opened score 25 and a portion of the deep scores 22 and 23 between the shallow scores 25 and 26. The severed plates 60-62 fall on the belt 42 and are advanced downstream as the new leading sheet edge 54 moves into and under the roll 50 as previously discussed. The above is repeated to open the score 26 and portions of the scores 22 and 23 to provide plates 63-65. When the last shallow score 27 is opened the deep scores 22 and 23 between (1) the leading edge 54 and shallow score 27 and (2) shallow score 27 and trailing edge 56 open to provide plates 66-71.

As can now be appreciated the invention is not limited to the above example which was presented for illustration purposes only. For example, the invention may be practiced on refractories other than glass such as ceramics sold by the Corborundum Corporation under the trademark MONOFRAX ® Ceramics and glass ceramics sold by PPG Industries, Inc. under the trademark HERCUVIT ® Glass Ceramics.

What is claimed is:

1. A method of simultaneously opening transverse scores imposed in a sheet of refractory material comprising the steps of:
    imposing at least one first score and at least one second score in the sheet, the scores transverse to one another and the at least one first score having a depth greater than the at least second score; and
    applying a bending moment force to the at least second score of sufficient magnitude to open the at least second score and open at least a portion of the at least first score by the shock resulting from opening the at least one second score.

2. The method as set forth in claim 1 wherein the at least one first score has depth of about 15 percent of the glass thickness.

3. The method as set forth in claim 2 wherein the at least one second score has depth of about at least about 2 percent of the glass thickness and less than about 15 percent of the glass thickness.

4. The method as set forth in claim 1 wherein said applying step includes the step of advancing the sheet along a sheet movement path through a snapping position with the at least one second score transverse to the direction of the sheet advance.

5. The method as set forth in claim 1 wherein the at least one first score is a plurality of first scores spaced from one another; the at least one second score is a plurality of second scores spaced from one another wherein the second scores are normal to and intersecting the first scores and practicing said applying step on the second score opens at least a position of the first scores between the opened second score and leading edge of the sheet.

6. The method as set forth in claim 5 wherein the sheet is a glass sheet; the first scores have a depth of about 15-80 percent of the glass thickness and the second scores have a minimum depth of about 2 percent of the glass thickness and a maximum depth of less than about 15 percent of the glass sheet thickness.

7. The method as set forth in claim 6 wherein the glass sheet has a thickness of about 0.078 inch (0.198 centimeter); the first scores have a depth of about 0.068 inch (0.173 centimeter) and the second scores have a depth of about 0.004 inch (0.010 centimeter) and a stress of about 1700 pounds per square inch (119 kilograms per square centimeter) is applied to the second score.

8. The method as set forth in claim 6 wherein the glass sheet has a thickness of about 0.124 inch (0.315 centimeter); the first scores have a depth of about 0.023 inch (0.058 centimeter) and the second scores have a depth of about 0.006-0.008 inch (0.015-0.020 centimeter) and a stress of about 2000 pounds per square inch (140 kilograms per square centimeter) is applied to a second score.

9. The method as set forth in claim 6 wherein the glass sheet has a thickness of about 7/32 inch (0.556 centimeter); the first scores have a depth of about 0.160 inch (0.406 centimeter) and the second scores have a depth of about 0.007-0.009 inch (0.018-0.023 centimeter) and a stress of about 2700 pounds per square inch (189 kilograms per square centimeter) is applied to the second score.

10. The method as set forth in claim 5 wherein said applying step is practiced on a moving glass sheet and includes the steps of:
    opening the second score immediately downstream of the leading edge of the glass sheet to open portions of the first scores between the opened second score and leading edge of the glass by the resultant shock of opening the second score; and
    opening the second immediately upstream of the trailing edge of the glass sheet designated as the last remaining score to open portions of the first scores between the leading edge and trailing edge of the glass sheet by the resultant shock of opening the last remaining score.

* * * * *